Patented Jan. 17, 1933

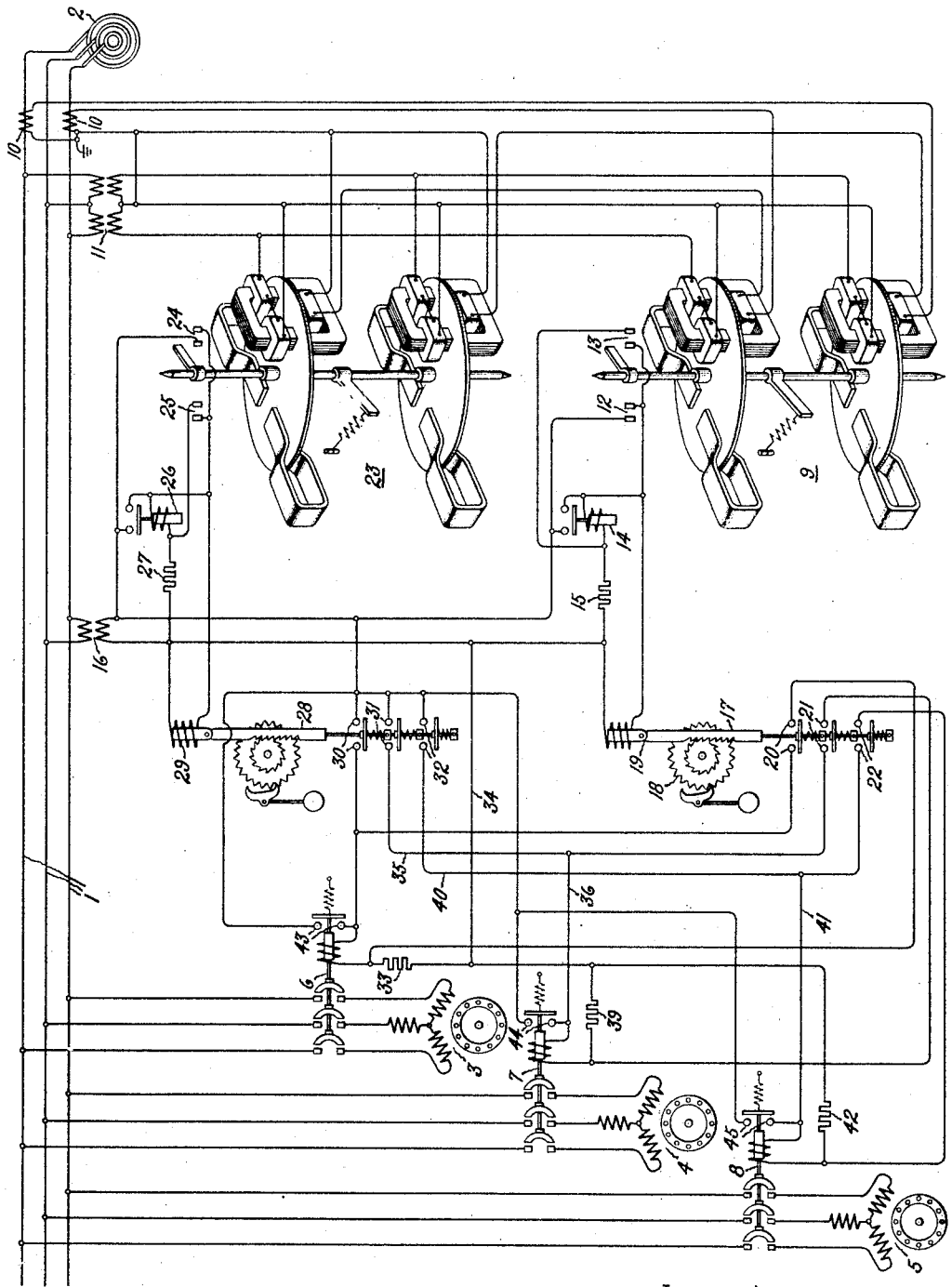

1,894,838

UNITED STATES PATENT OFFICE

WILLIAM E. WEAVER, OF TORONTO, ONTARIO, CANADA, ASSIGNOR TO GENERAL ELECTRIC COMPANY, A CORPORATION OF NEW YORK

ELECTRICAL CONTROL SYSTEM

Application filed January 12, 1932, Serial No. 586,172, and in Canada May 28, 1931.

My invention relates to electrical control systems, and more particularly to an automatic electrical load control system for sequentially connecting or disconnecting incremental loads to a supply circuit in response to variations in load on that circuit.

Heretofore there have been devised numerous automatic electrical load control systems in which the total load on a supply circuit is automatically controlled and maintained within certain predetermined limits by automatically connecting and disconnecting therefrom a plurality of load increments. The general purpose of such arrangements is to prevent the establishment of new high maximum demand periods resulting in an increased demand charge on the consumer. The load increments may be individual motor operated devices, such as compressors, grinders, etc., or they may be heating devices such as furnaces, steam generators, water heaters, etc., or they may be electro-plating baths or other electro-chemical type loads. Numerous load increments of any or all of the above types are found in many industrial plants and often they may be shut down for comparatively short periods of time without seriously impairing their individual operation or the production of the plant as a whole. By automatically shutting down one or more of these load increaments as the total load of the plant approaches and tends to exceed a predetermined peak value, the establishment of new maximum demands may be prevented, thereby preventing the establishment of a new and higher demand charge, with the result that a very appreciable monetary saving may be had.

In existing automatic load regulating systems of the above described type, the load increments are usually removed in a certain sequence when the total load tends to exceed a predetermined value and are then reconnected to the circuit in reverse sequence, or in a nonsequential order, when the total load on the plant tends to fall below the limiting predetermined high value. The result is that the first load increment which is removed is often the last one to be restored and is consequently out of operation for a considerably longer period of time than is the last load increment which was removed and which is the first one to be restored. Such operation may result in seriously impairing the usefulness and output of the first few increments which are removed.

In accordance with my invention I provide a novel automatic electrical regulating system which, among other features, provides for the connection and disconnection of translating devices to and from a power circuit in the same sequence in response to variations in an electrical condition of the circuit.

An object of my invention is to provide a new and improved automatic electric regulating system.

Another object of my invention is to provide an automatic electric load regulating system which sequentially connects and disconnects a plurality of incremental loads to a power circuit in the same order in response to variations in the total load on the power circuit.

My invention will be better understood from the following description taken in connection with the accompanying drawing and its scope will be pointed out in the appended claims.

Referring now to the single figure of the accompanying drawing, wherein I have illustrated diagrammatically an embodiment of my invention, a load circuit 1, which is illustrated as a three-phase alternating current circuit, by way of example, and which may be the main load circuit of an industrial plant, is connected to be supplied with energy from any suitable source of current supply such as a three-phase alternating current generator 2. Among the numerous separate load devices connected to the main load circuit of an industrial plant, will be a plurality of load increments which may be intermittently shut down for relatively short periods of time. By way of example, such load increments are illustrated as three-phase induction motors, 3, 4 and 5. These load devices 3, 4 and 5 are adapted to be connected to and disconnected from circuit 1 by means of any suitable circuit controllers, such as the circuit breakers 6, 7 and 8, respectively, for example.

Connected to respond to the power flow in circuit 1, and to initiate the sequential disconnection of the load increments 3, 4 and 5 when the total load on circuit 1 exceeds a predetermined value, is a power responsive device 9, which may be of any suitable type and which is illustrated as a conventional three-phase contact making induction type wattmeter, whose current and potential coils are connected in a conventional manner to circuit 1 by means of current and potential transformers 10 and 11 respectively. Power responsive device 9, which may conveniently be designated as an over-power responsive relay, has a set of contacts 12 which are adapted to be closed when the total load on circuit 1 exceeds a predetermined maximum value and a second pair of contacts 13 which are adapted to be closed whenever the total load on circuit 1 falls below this predetermined high value.

In order to relieve the contacts 12 of the over-power relay 9 of carrying a relatively heavy control current and also in order to avoid intermittent operation of the system as a whole in the event that vibration, or other causes, cause fluttering or vibration of the contacts of the relay 9, a suitable auxiliary relay 14 is provided. Contacts 12 are connected in series with the operating coil of relay 14 and a suitable current limiting resistor 15 across any suitable source of control current, such as the secondary winding of a suitable transformer 16 connected to one of the phases of the load circuit 1. The contacts of relay 14 are connected in parallel with the over-power closing contacts 12 of the over-power relay 9 and consequently when relay 14 is actuated it seals itself in so that fluttering and momentary opening of the contacts 12 will not affect the energization of relay 14. The contacts 13 of over-power relay 9 are connected to short circuit the operating coil of relay 14 so that when these contacts 13 are closed the relay 14 will become deenergized.

Arranged to be controlled by the operating relay 14 is a time delayed operating relay 17 for controlling the sequential disconnection of the load instruments 3, 4 and 5 from circuit 1. As shown, the operating winding of relay 17 is connected in parallel with the operating winding of relay 14 so that whenever relay 14 is energized relay 17 will be actuated, and whenever relay 14 is deenergized relay 17 will be deenergized. The time delay elements of relay 17 may take any one of a number of well known forms, and as shown a simple mechanical escapement mechanism 18 is provided, so that upon actuation of relay 17 its armature will be slowly drawn upward due to the time delay action of the element 18, but as soon as relay 17 is deenergized the armature will drop rapidly due to a hinged connection 19 which allows the ratchet teeth of the core member to slide past the cooperating ratchet teeth of the escapement mechanism 18. Relay 17 is provided with three sets of contacts 20, 21 and 22 which are arranged to be closed sequentially upon the actuation of this relay. Contacts 20, 21 and 22 are arranged to short circuit the operating, or holding, windings of circuit controllers 6, 7 and 8 respectively and thereby control the disconnection of load increments 3, 4 and 5 from circuit 1. As shown, contacts 20, 21 and 22 are connected across the operating coils of the circuit controllers 6, 7 and 8 respectively.

For initiating the sequential connection of the load increments, or units, to the circuit 1, when the load on this circuit falls below a predetermined value I provide an under-power relay 23 which is preferably an ordinary contact making induction type polyphase wattmeter which is similar in design and construction to over-power relay 9. The potential and current coils of relay 23 are connected in parallel and in series respectively with the corresponding coils of the relay 9. Relay 23 has a pair of under-power closing contacts 24 and a pair of contacts 25 which are closed whenever the load on circuit 1 is above the predetermined low value at which the contacts 24 are closed. An auxiliary relay 26 is provided and this relay corresponds in construction and function to the relay 14. The operating winding of relay 26 is connected in series with the under-power closing contacts 24 and a current limiting resistor 27 across the supply transformer 16. Thus whenever contacts 24 are closed relay 26 will be actuated, and its contacts, which are connected in parallel with the contacts 24, act to seal this relay 26 in its energized position. The contacts 25 are connected across the operating winding of relay 26 and when closed short circuit its winding thereby causing the deenergization of this relay.

Under the control of the contacts of relay 26 is a time delayed acting relay 28 for controlling the sequential connection of the load increments 3, 4 and 5 to circuit 1. Relay 28 corresponds in construction to relay 17 and has its operating winding 29 connected in parallel to the operating winding of relay 26 so that these relays will be energized and deenergized together. Relay 28 has three sets of sequentially closing contacts 30, 31, and 32 which control respectively the energization of the operating windings of the circuit controllers 6, 7 and 8. Thus when contacts 30 close a circuit is completed from one side of the transformer 16 through the operating winding of circuit controller 6, the current limiting resistor 33 and conductor 34 to the other side of the supply transformer 16. Similarly, when contacts 31 close a predetermined time after the closing of contacts 30 a circuit is completed from one side of the supply transformer 16 through conductors 35 and 36, the operating winding of circuit controller 7, the current limiting resistor 39 and back to the other side of the supply transformer 16 through conductor 34. In a like manner, when the contacts 32 close a predetermined time after the closing of contacts 31, a circuit is completed on one side of the supply transformer 16 through conductors 40 and 41, the operating winding of circuit controller 8, the current limiting resistor 42 and back to the other side of the supply transformer 16 through conductor 34.

Back contacts 43, 44 and 45 are provided on circuit controllers 6, 7 and 8 respectively and these contacts are connected in parallel with contacts 30, 31 and 32, respectively, of relay 28. Consequently, whenever one of the circuit controllers 6, 7 or 8 is energized, its respective back contacts will be closed, thereby sealing the circuit controller in closed position regardless to whether the contacts 30, 31 and 32 open again.

The purpose of providing relays 17 and 28 with time delay mechanisms is to prevent undue operation and consequent wear and tear on the system as a result of momentary over or under load on the circuit 1. Also by providing a time delay between the sequential closure of each of the contacts on the relay, the system will have time to adjust itself to each connection or disconnection of a load increment before determining whether it is necessary to connect or disconnect an additional load increment in order to secure the necessary regulation. Consequently this prevents an overrunning or hunting of the system which also prevents unnecessary operation of the various elements thereof.

The operation of the system illustrated in the drawing is as follows: Assume that generator 2 is operating in the usual manner to supply power to circuit 1, and that the total load on circuit 1 falls below the predetermined minimum load value for which relay 23 is set to close contacts 24. Under these circumstances contacts 24 will close, thereby energizing relay 26 which seals itself in, thus preventing chattering in case of a vibratory and intermittent engagement of the contacts 24. The energization of relay 26 also causes the energization of coil 29 of relay 28 and this relay will start to operate. In a predetermined time its contacts 30 will close, thereby energizing the operating winding of circuit controller 6 and connecting load increment 3 to circuit 1, thereby increasing the total load on circuit 1. At the same time, the back contacts 43 of controller 6 close so that the circuit controller is sealed in the closed position and will remain in this position regardless of whether contacts 30 are open or closed. If the addition of load increment 3 is sufficient to raise the total load on circuit 1 above the minimum value for which the relay 23 is set to close contacts 24, these contacts will be opened and contacts 25 will be closed, thereby deenergizing relays 26 and 29. If, however, the addition of load increment is not sufficient to raise the total load enough to cause its operation, relay 28 will continue operation and in a predetermined time will close its contacts 31 thereby operating circuit controller 7 which seals itself in and causes the connection of load increment 4 to circuit 1. If the addition of this load increment 4 is sufficient to raise the total load above the predetermined minimum value, relay 28 will be deenergized as described in connection with the addition of increment 3. If, however, the load is still too low, contacts 32 of relay 28 will close at a predetermined time thereby operating circuit controller 8 which seals itself in and connects load increment 5 to circuit 1. This might continue indefinitely depending upon how many load increments it is desired to have in the system and upon how low the total load is. Assume, however, that when load increment 5 is connected to circuit 1, the total load on this circuit increases above the minimum value at which contacts 24 close and consequently relay 23 will operate to close its contacts 25 thereby simultaneously deenergizing relays 26 and 28.

If now the total load on circuit 1 should increase above the maximum value for which over power relay 9 is set to close its overpower closing contacts 12, relays 14 and 17 will be energized and in a predetermined time contacts 20 of relay 17 will close thereby short circuiting the operating windings of circuit controller 6 and disconnecting the load increment 3 from the circuit. It should be noted that load increment 3 was the first increment to be connected to circuit 1 and also that it is the first increment to be disconnected therefrom. If the disconnection of increment 3 does not decrease the total load sufficiently to open contacts 12 and close contacts 13, relay 17 will continue to operate and in a predetermined time contacts 21 will close thereby disconnecting load increment 4 from circuit 1. Similarly, if this does not cause the opening of contacts 12 and the closure of contacts 13 relay 17 will continue to operate and in a predetermined time its contacts 22 will close thereby disconnecting load increment 5 from circuit 1. This might continue indefinitely depending upon the magnitude of the overload on circuit 1 and the number of load increments which are arranged to be disconnected from the circuit.

It should be noted that the load increments were connected to circuit 1 in the order 3, 4, 5, and that they were sequentially disconnected from the circuit in this same order, thereby tending to equalize the time when each one of these increments is connected and disconnected from the main circuit 1.

Although I have described relays 9 and 23 as over-power and under-power relays, respectively, it will of course be obvious to those skilled in the art that any relay which responds to the condition of circuit 1 which it is desired to regulate, may also be employed. Thus, for example, if it is still desired to regulate power and if circuit 1 is a constant voltage circuit, relays 9 and 23 might be current relays without departing from my invention in its broader aspects.

While I have shown and described a particular embodiment of my invention, it will be obvious to those skilled in the art that changes and modifications may be made without departing from my invention, and I therefore aim in the appended claims to cover all such changes and modifications as fall within the true spirit and scope of my invention.

What I claim as new and desire to secure by Letters Patent of the United States is:

1. In combination, an electric circuit, a plurality of electric translating devices adapted for connection to said circuit, and means responsive to an electrical condition of said circuit for selectively connecting and disconnecting said translating devices to and from said circuit in the same sequence.

2. In combination, an electric power circuit, a plurality of load increments adapted for connection to said circuit, and means responsive to the power flow in said circuit for selectively connecting or disconnecting said load increments to or from said circuit in the same sequence.

3. In combination, an electric power circuit, a plurality of load increments adapted for connection to said circuit, and means having a time delayed action responsive to the power flow in said circuit for selectively connecting or disconnecting said load increment to or from said circuit in the same sequence.

4. In combination, an electric power circuit, a plurality of load increments connected to said circuit, means for disconnecting said load increments from said circuit in a certain sequence when the load on said circuit exceeds a predetermined value, and means for reconnecting said load increments to said circuit in the same sequence when the load on said circuit falls below a predetermined value.

5. In combination, an electric power circuit, a plurality of load increments connected to said circuit, means having a time delayed action for disconnecting said load increments from said circuit in a certain sequence when the load on said circuit exceeds a predetermined value, and means having a time delayed action for reconnecting said load increments to said circuit in the same sequence when the load on said circuit falls below a predetermined value.

6. In combination, an electric power circuit, a plurality of load increments adapted for connection to said circuit, an over-power relay connected to said circuit, an under-power relay connected to said circuit, and time delay operating means for sequentially disconnecting and connecting said load increments from and to said circuit in accordance with the respective operation of said relays.

7. In combination, an electric power circuit, a plurality of load increments connected to said circuit, an under-power responsive relay connected to said circuit, an intermediate relay under the control of said under-power relay, said intermediate relay having a plurality of sequentially operating contacts for sequentially disconnecting said load increments from said circuit, an over-power relay connected to said circuit, a second intermediate relay under the control of said over-power relay, said second intermediate relay having sequentially operating contacts for sequentially disconnecting said load increments from said power circuit in the same order in which they are connected thereto.

8. In combination, an electric power circuit, a plurality of load increments connected to said circuit, an under-power responsive relay connected to said circuit, a time delayed acting intermediate relay under the control of said under power relay, said intermediate relay having a plurality of sequentially operating contacts for sequentially disconnecting said load increments from said circuit, an over-power relay connected to said circuit, a second time delayed acting intermediate relay under the control of said over-power relay, said second intermediate relay having sequentially operating contacts for sequentially disconnecting said load increments from said power circuit in the same order in which they are connected thereto.

In witness whereof I have hereunto set my hand.

WILLIAM E. WEAVER.